US008873383B2

(12) United States Patent
Kröselberg et al.

(10) Patent No.: US 8,873,383 B2
(45) Date of Patent: Oct. 28, 2014

(54) METHOD FOR PROVIDING SERVICE QUALITY IN A WIMAX COMMUNICATION NETWORK, AND METHOD FOR SELECTING AN ACCESS TRANSPORT RESOURCE CONTROL FUNCTION BY MEANS OF A GUIDELINE DECISION-MAKING FUNCTION IN A COMMUNICATION NETWORK

(75) Inventors: Dirk Kröselberg, München (DE); Domagoj Premec, Zagreb (HR); Hannes Tschofenig, Espoo (FI); Richard Wisenöcker, Vienna (AT)

(73) Assignee: Siemens Aktiengesellschaft, Munich (DE)

( * ) Notice: Subject to any disclaimer, the term of this patent is extended or adjusted under 35 U.S.C. 154(b) by 1834 days.

(21) Appl. No.: 12/160,594

(22) PCT Filed: Dec. 20, 2006

(86) PCT No.: PCT/EP2006/070011
§ 371 (c)(1),
(2), (4) Date: Sep. 7, 2010

(87) PCT Pub. No.: WO2007/080050
PCT Pub. Date: Jul. 19, 2007

(65) Prior Publication Data
US 2010/0329129 A1    Dec. 30, 2010

(30) Foreign Application Priority Data

Jan. 10, 2006  (DE) .......................... 10 2006 001 274
Mar. 20, 2006  (DE) .......................... 10 2006 012 655

(51) Int. Cl.
*G01R 31/08*      (2006.01)
*H04L 29/06*      (2006.01)
*H04W 28/24*      (2009.01)
*H04W 12/06*      (2009.01)
*H04W 72/08*      (2009.01)
*H04W 4/24*       (2009.01)

(52) U.S. Cl.
CPC .............. *H04W 72/087* (2013.01); *H04L 63/08* (2013.01); *H04W 28/24* (2013.01); *H04W 4/24* (2013.01); *H04L 63/0892* (2013.01); *H04W 12/06* (2013.01); *H04L 63/20* (2013.01)
USPC ....................................................... 370/230

(58) Field of Classification Search
USPC ......... 370/338, 331, 401, 352, 254, 389, 230, 370/329, 354, 356, 395.2, 395.3, 395.52, 370/395.53, 466; 455/436, 432.1, 433, 442, 455/411; 726/4, 26, 2, 1, 12, 17, 21, 6; 713/153, 150, 182, 161, 170; 709/218, 709/219, 220, 225, 228, 229, 249; 380/270
See application file for complete search history.

(56) References Cited

U.S. PATENT DOCUMENTS 6,910,074 B1 *  6/2005  Amin et al. ................... 709/227
7,448,075 B2 * 11/2008  Morand et al. .................. 726/7

(Continued)

FOREIGN PATENT DOCUMENTS

EP    1 619 971              1/2006
EP    001619917 A1 *         1/2006    ............... H04Q 7/38

(Continued)

OTHER PUBLICATIONS

Standard IEEE 802.16, 2001, "Part 16: Air Interface for Fixed Broadband Wireless Access Systems", Apr. 8, 2002.

(Continued)

*Primary Examiner* — Ricky Ngo
*Assistant Examiner* — Phuongchau Ba Nguyen
(74) *Attorney, Agent, or Firm* — Staas & Halsey LLP

(57) ABSTRACT

A method provides service quality in a WiMAX communication network, and a method selects an access transport resource control function by a guideline decision-making function in a communication network. According to a method for providing service quality on an air interface of an access network in a WiMAX communication network by an application function, the application function aims to provide a user of the WiMAX communication network with a service quality-related application. The desired service quality is signaled by an authentication, authorization and accounting infrastructure of the WiMAX communication network.

7 Claims, 5 Drawing Sheets

(56) References Cited

U.S. PATENT DOCUMENTS

| | | | |
|---|---|---|---|
| 2005/0169253 A1* | 8/2005 | Hu | 370/352 |
| 2006/0047822 A1* | 3/2006 | Willis | 709/228 |
| 2006/0218302 A1* | 9/2006 | Chia et al. | 709/245 |
| 2007/0005972 A1* | 1/2007 | Mizikovsky et al. | 713/171 |
| 2010/0198710 A1* | 8/2010 | Zhang et al. | 705/30 |

FOREIGN PATENT DOCUMENTS

| | | | |
|---|---|---|---|
| WO | 2004/093480 | 10/2004 | |
| WO | WO 2004093480 A1 * | 10/2004 | H04Q 7/38 |

OTHER PUBLICATIONS

P. Yegani, "WiMAX Overview", IETF-64, Nov. 7-11, 2005, http://www3.ietf.org/proceedings/05nov/slides/16ng-4.pdf.

H.L. Lu, "Resource and Admissions Control in Next Generation Networks—the ITU-T View", MFA Forum NGN Event, Oct. 31, 2005, http://www.mfaforum.org/events/RACF-MFA__Hui-Lan%20Lu.pdf.

H.L. Lu, "Quality of Service in Next Generation Networks", NGN Industry Event, Nov. 18, 2005, http://www.itu.intl/ITU-T/worksem/ngn/200511/presentations/lu.zip.

H. Tschofenig et al., "RADIUS Quality of Service Support", draft-tschofenig-radext-qos-02.txt, Oct. 2005.

F. Alfano et al., "Diameter Quality of Service Application", draft-alfano-aaa-qosprot-04.txt, Sep. 2005.

ITU-T Studygroup 11, Series Q: Switching and Signaling—"Signalling requirements for IP-QoS" ITU-T Q-series Recommendations, Supplement 51, Dec. 2004.

L. Dell'Uomo et al., "An All-IP Solution for QoS Mobility Management and AAA in the 4G Moblile Networks", 5th International Symposium on Wireless Multimedia Communications, Oct. 2002, vol. 2, pp. 591-595.

Office Action issued by the Korean Patent Office on Apr. 23, 2013 in the corresponding Korean patent application No. 10-2008-7019407.
Office Action issued by the European Patent Office on Nov. 19, 2013 in the corresponding European patent application No. 06 841 511.6.
Chinese Office Action issued Jun. 11, 2014 in corresponding Chinese Patent Application No. 200680050824.3.

* cited by examiner

METHOD FOR PROVIDING SERVICE QUALITY IN A WIMAX COMMUNICATION NETWORK, AND METHOD FOR SELECTING AN ACCESS TRANSPORT RESOURCE CONTROL FUNCTION BY MEANS OF A GUIDELINE DECISION-MAKING FUNCTION IN A COMMUNICATION NETWORK

CROSS REFERENCE TO RELATED APPLICATIONS

This application is based on and hereby claims priority to German Application No. 10 2006 001 274.7 filed on Jan. 10, 2006, German Application No. 10 2006 012 655.6, filed on Mar. 20, 2006 and PCT Application No. PCT/EP2006/070011 filed on Dec. 20, 2006, the contents of which are hereby incorporated by reference.

BACKGROUND OF THE INVENTION

The invention relates to a method for providing a quality of service on a radio interface of an access network in a WiMAX communication network. The invention further relates to a method for selecting an access transport resource control function.

WiMAX, an abbreviation for Worldwide interoperability for Microwave Access, is an industry consortium which defines a network architecture for a WiMAX communication network on the basis of a technology for a radio interface for wireless data transmission in accordance with the IEEE 802.16 standard. The network architecture of the WiMAX communication network is the subject of a standardization process. For the WiMAX communication network, it is intended that a quality of service for the data transmission can be predetermined depending on requirements of the relevant service. The quality of service is also designated by the abbreviation QoS.

An overview of WiMAX communication networks and a corresponding network architecture is disclosed in Parviz Yegani, "WiMAX Overview", IETF-64, 7-11 Nov. 2005, Vancouver, Canada, http://www3.ietf.org/proceedings/05nov/slides/16ng-4.pdf (downloaded and printed on 27.02.2006). A framework for signaling the quality of service is also disclosed. However, the manner in which the signaling of the quality of service takes place is not disclosed.

WO 2004/093480 A1 discloses a communication system and a communication method. A network terminal which takes advantage of a service controls a quality of service of the data transmission and collects the QoS-related data that is required for this purpose. An authentication, authorization and accounting infrastructure is used for transmitting QoS-related configuration parameters, which are defined by a Service Level Agreement Manager of a home network of the network terminal, to the terminal.

Solutions that have been developed by other standardization organizations for signaling the quality of service in communication networks are only partly applicable to WiMAX communication networks. In IETF, the focus of the work has been on path-coupled signaling, which is known as e.g. Next Step in Signaling (NSIS) or Resource reSerVation Protocol (RSVP). A different architectural approach has been followed by 3GPP, ITU-T and ETSI TISPAN. According to this approach, software which provides a QoS-related application is assigned to the relevant access network in which the user is currently registered. In the case of WiMAX communication networks, however, the software is assigned independently of the relevant access network, e.g. to a home network of the user. As a result of this, however, the software does not know the access network of the user.

In the Study Group 11 of the ITU-T (International Telecommunication Union Telecommunication Standardization Sector), a further network architecture of a communication network is the subject of a standardization process. This involves a so-called Next Generation Network, in which provision is likewise made for a quality of service of a data transmission to be pre-determinable.

"Series Q: Switching and Signaling—Signaling requirements for IP-QoS", ITU-T Q-Series Recommendations, Supplement 51, 12/2004 discloses the manner in which IP-based signaling of the quality of service is to take place in the communication network. Further information relating to the signaling of quality of service are disclosed in Hui-Lan Lu, "Resource and Admission Control in Next Generation Networks—the ITU-T View", MFA Forum NGN Event, 31 Oct. 2005, http://www.mfaforum.org/events/RACF-MFA_Hui-Lan%20Lu.pdf (downloaded and printed on 27.02.2006) and Hui-Lan Lu, "Quality of Service in Next Generation Networks", NGN Industry Event, 18 Nov. 2005, London, http://www.itu.int/ITU-T/worksem/ngn/-200511/presentations/lu.zip (downloaded and printed on 27.02.2006).

SUMMARY

The inventors considered the problem of specifying a method, which method is simple, for providing a quality of service in a WiMAX communication network. The inventors further considered the problem of specifying a method, which method is simple, for selecting an access transport resource control function by a policy decision function in a communication network.

According to a first aspect, inventors propose a method for providing a quality of service on a radio interface of an access network in a WiMAX communication network by an application function. The application function is intended to provide a QoS-related application to a user of the WiMAX communication network. The desired quality of service is signaled using an authentication, authorization and accounting infrastructure (AAA infrastructure) of the WiMAX communication network. The application function communicates with an authentication, authorization and accounting server (AAA server) of a home network of the user for the purpose of authenticating and authorizing the user. The desired quality of service for the QoS-related application is transmitted to the AAA server in the context of this communication for authorization.

The advantage is that the AAA infrastructure is already provided for the authentication and authorization of users of the WiMAX communication network during a network access procedure, by which the user concerned is granted access to the access network or is denied access, and for the accounting of services. Consequently, it is not necessary to introduce any new components into the network architecture of the WiMAX communication network in order to signal the quality of service. As a result of the network access procedure, the access network in which the user is currently registered is known in the AAA infrastructure. The access network in which the quality of service must be signaled is also known as a result of this. This allows simple, dynamic signaling of the quality of service depending on particular current requirements relating to the quality of service. A further advantage is that the AAA server in the home network of the user is known to the application function, and the application function can thus communicate easily with the AAA server. Furthermore, the application function and the AAA server can also communicate with each other in order to authenticate and authorize the user for the use of the application function. The desired quality of service can thus be transmitted very easily from the application function to the AAA server.

In this context, it is advantageous if, after the authentication and authorization of the user, a QoS request is submitted to an authentication, authorization and accounting client (AAA client) of the access network in order to provide the desired quality of service on the radio interface. The advantage is that the AAA client is situated in the access network in which the user is registered, and which is closest to the user in the AAA infrastructure, and can therefore very easily initiate the provision of the desired quality of service on the radio interface.

In this context, it is further advantageous if the AAA server communicates with an authentication, authorization and accounting proxy (AAA proxy) and the QoS request is forwarded to the AAA client via the AAA proxy. This has the advantage that, in the case of a large access network comprising many AAA clients, the AAA clients of the access network need not be directly known to the AAA server and the communication with the relevant AAA client can take place more easily via the shared AAA proxy of the access network.

In this context, it is further advantageous if local policies are applied by the AAA proxy and an admission control is carried out in the access network. The advantage is that the AAA proxy can manage the available resources of the whole access network, such that these do not have to be requested first by the individual AAA clients. The AAA clients can thus be simpler in design.

In a further advantageous embodiment, the AAA client communicates with a base station in order to perform the signaling of the desired quality of service on a connection level, in order to provide the quality of service on the radio interface. The AAA client can be configured separately from the base station, in particular in a gateway of the access network, or can be included in the base station. The base station makes the radio interface available to the user as a resource. The advantage is that the quality of service on the radio interface can thus be established very easily between a network terminal of the user and the base station on the connection level.

In this context, it is advantageous if, after signaling the quality of service on the connection level, a QoS confirmation is reported back along the AAA infrastructure to the AAA server. This has the advantage that the AAA server is thereby notified that the desired quality of service is available or could not be made available if applicable. In addition, this can then also be reported back from the AAA server to the application function.

According to a second aspect, the inventors propose a method for selecting an access transport resource control function by a policy decision function in a communication network. A client access device is assigned to the access transport resource control function. In the communication network, each network operator has at least one network attachment control function which is informed of an identity of the relevant access network. This identity is utilized by the client access device in order to obtain an access to the access network. The policy decision function interacts via a reference point with the network attachment control function for the purpose of ascertaining the access network in which a user of the customer access device is situated. The access transport resource control function which is associated with the access network is selected by the policy decision function.

The advantage is that the network attachment control function also grants the access to the access network and is therefore informed of the identity of the access network in which the client access device of the user is situated. The policy decision function can therefore find and select the access network and the associated access transport resource control function very easily by requesting this information from the network attachment control function accordingly.

In an advantageous embodiment of the second aspect, the reference point represents an AAA infrastructure of the communication network. This has the advantage that the AAA infrastructure is already provided for the authentication and authorization of the user during a network access procedure. As a result of this, no additional components are required in the communication network.

In a further advantageous embodiment of the second aspect, provision is made for an interface between the policy decision function and the access transport resource control function, via which information that comes from the network attachment control function and is relevant for the access transport resource control function is transmitted to the access transport resource control function by the policy decision function. The advantage is that this allows the policy decision function and the network attachment control function to communicate directly with each other, and the network attachment control function and access transport resource control function to communicate indirectly with each other via the policy decision function. As a result of this, the communication between the network attachment control function and the policy decision function can be particularly simple and the direct communication between the network attachment control function and the access transport resource control function is then not necessary.

In a further advantageous embodiment of the second aspect, the information specifying the access network in which the user of the customer access device is situated is utilized for signaling a desired quality of service. The advantage is that the quality of service can thus be signaled to the access network very easily.

BRIEF DESCRIPTION OF THE DRAWINGS

These and other objects and advantages of the present invention will become more apparent and more readily appreciated from the following description of the preferred embodiments, taken in conjunction with the accompanying drawings of which.

DETAILED DESCRIPTION OF THE PREFERRED EMBODIMENT

Figure 1:
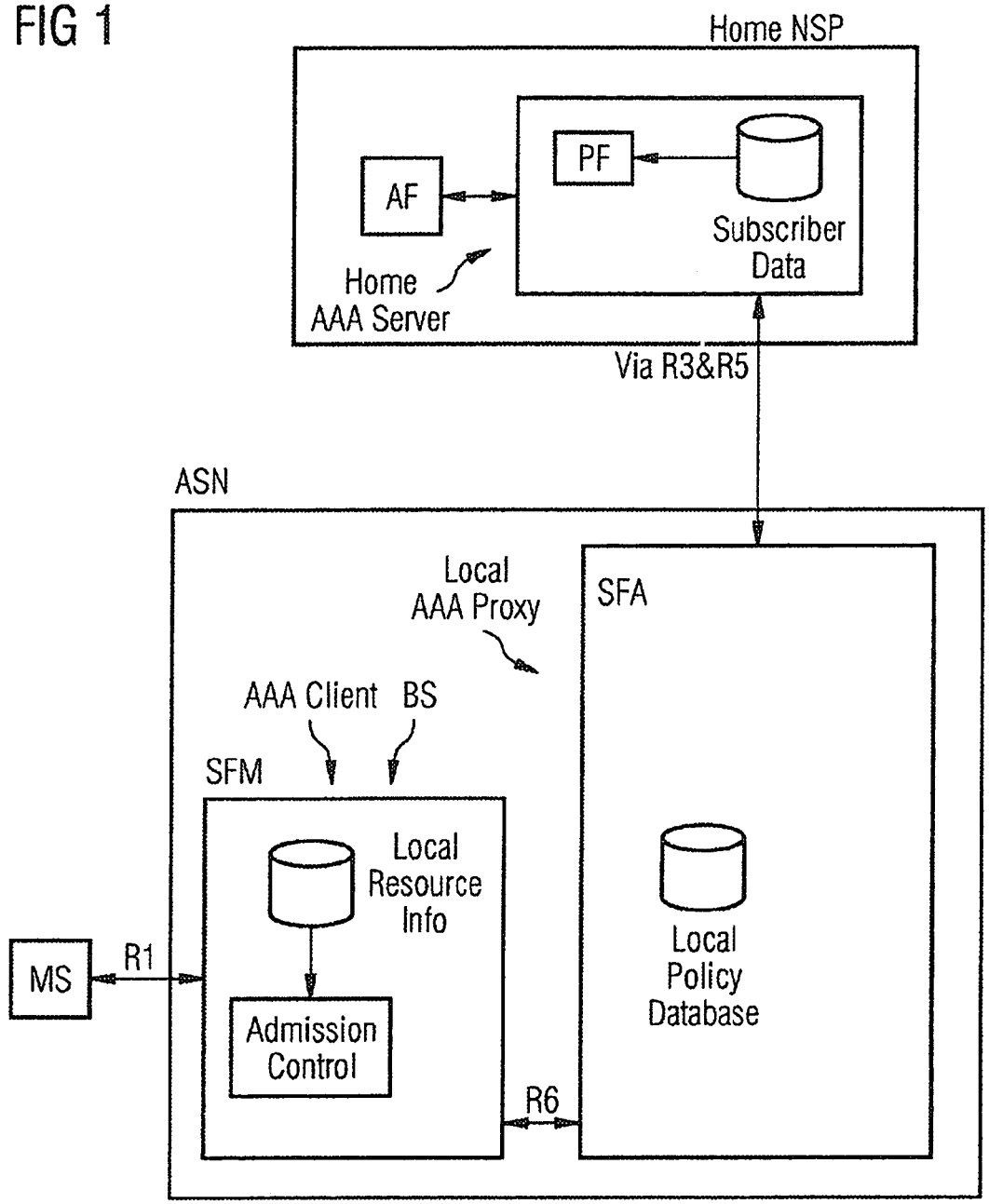
FIG. 1 shows a network architecture of a WiMAX communication network with regard to signaling a quality of service.

Reference will now be made in detail to the preferred embodiments of the present invention, examples of which are illustrated in the accompanying drawings, wherein like reference numerals refer to like elements throughout.

In a WiMAX communication network, provision is made for a quality of service (QoS) for a data transmission to be pre-determinable depending on requirements of the service concerned. The quality of service relates to e.g. a transmission bandwidth which must be guaranteed, or a maximal time delay which must not be exceeded in relation to the data that is to be transmitted on a path from a sender to a recipient of the data. For example, services providing audio or in particular video streams place high demands on a transmission bandwidth of the communication network. If telephone calls are transmitted, e.g. using voice over IP (VoIP), any time delay in relation to the transmitted data must be short.

A particular feature of a network architecture of the WiMAX communication network is that an application function AF on one side and an access network ASN on the other side are independent from each other. The application function AF represents e.g. a SIP proxy. The access network ASN can also be referred to as a visited network or an Access Service Network. A user with a network terminal MS can register with the access network ASN. The network terminal MS is e.g. a mobile telephone, a personal digital assistant (PDA) or other portable computer and is designed to communicate wirelessly in the WiMAX communication network.

The relevant application function AF, which the user with the network terminal MS wishes to use, essentially only knows a network address of the network terminal MS, but does not know in which access network ASN the network terminal MS is currently registered. The problem therefore arises of determining this access network ASN and signaling to it the quality of service that is required for the use of the application function AF, in order that the access network ASN can provide the desired quality of service. In the case of the WiMAX communication network, of particular importance is the provision of the quality of service on a radio interface R1 between the network terminal MS of the user and the access network ASN.

FIG. 1 shows the network architecture of the WiMAX communication network with regard to signaling the quality of service on the radio interface R1. The network terminal MS of the user is linked to the access network ASN via the radio interface R1. The access network ASN features at least one base station BS, which makes the radio interface R1 available for the network terminal MS. The base station BS features a service flow management unit SFM or is linked to the service flow management unit SFM. The service flow management unit SFM is configured to grant or deny access to resources of the base station BS locally, i.e. in relation to the base station BS, by a local admission control, and to provide and manage the resources, e.g. transmission bandwidth on the radio interface R1.

The service flow management unit SFM also features a local authentication, authorization and accounting client AAA Client or is configured as such. Alternatively, the authentication, authorization and accounting client AAA Client can include the service flow management unit SFM, or the authentication, authorization and accounting client AAA Client and the service flow management unit SFM can also be configured or arranged separately from each other. For example, the authentication, authorization and accounting client AAA Client can also be arranged in a gateway of the access network ASN. The authentication, authorization and accounting client AAA Client begins a network access procedure when the user with the network terminal MS wishes to register with the access network ASN in order to gain access to the access network ASN.

The service flow management unit SFM is linked to a service flow authorization unit (SFA) via an interface R6. The service flow authorization unit SFA is configured to apply local policies relating to the access network ASN for the authorization of the user in respect of the use of the resources of the access network ASN. The service flow authorization unit SFA is preferably configured to carry out this authorization for all base stations BS of the access network ASN, i.e. only one service flow authorization unit SFA needs to be provided in the access network ASN. The service flow authorization unit SFA is preferably informed of the available resources of the relevant base stations BS.

The service flow authorization unit SFA includes a local authentication, authorization and accounting proxy Local AAA Proxy or is configured as such for the authorization. Alternatively, the authentication, authorization and accounting proxy Local AAA Proxy can include the service flow authorization unit SFA. The authentication, authorization and accounting proxy Local AAA Proxy is configured to communicate with the relevant authentication, authorization and accounting client AAA Client for the authentication and authorization of the user during the network access procedure.

The access network ASN is linked via interfaces R3 and R5 to a home network Home NSP of the user, which can also be referred to as Network Service Provider. The home network Home NSF includes the application function AF or is linked to this. The home network Home NSP also includes a policy function PF. The policy function PF includes an authentication, authorization and accounting server Home AAA Server or is configured as such. Alternatively, the authentication, authorization and accounting server Home AAA Server includes the policy function PF. The policy function PF or the authentication, authorization and accounting server Home AAA Server has access to information concerning all users of the home network Home NSP, in particular information relating to access or usage rights for the access to the access network ASN or for the use of the application function AF, and to information relating to accounting, e.g. the accounting for the use of the application function AF or of the access network ASN. The application function AF is configured to communicate with the policy function PF of the home network Home NSP for authentication, authorization and accounting purposes.

Figure 2:
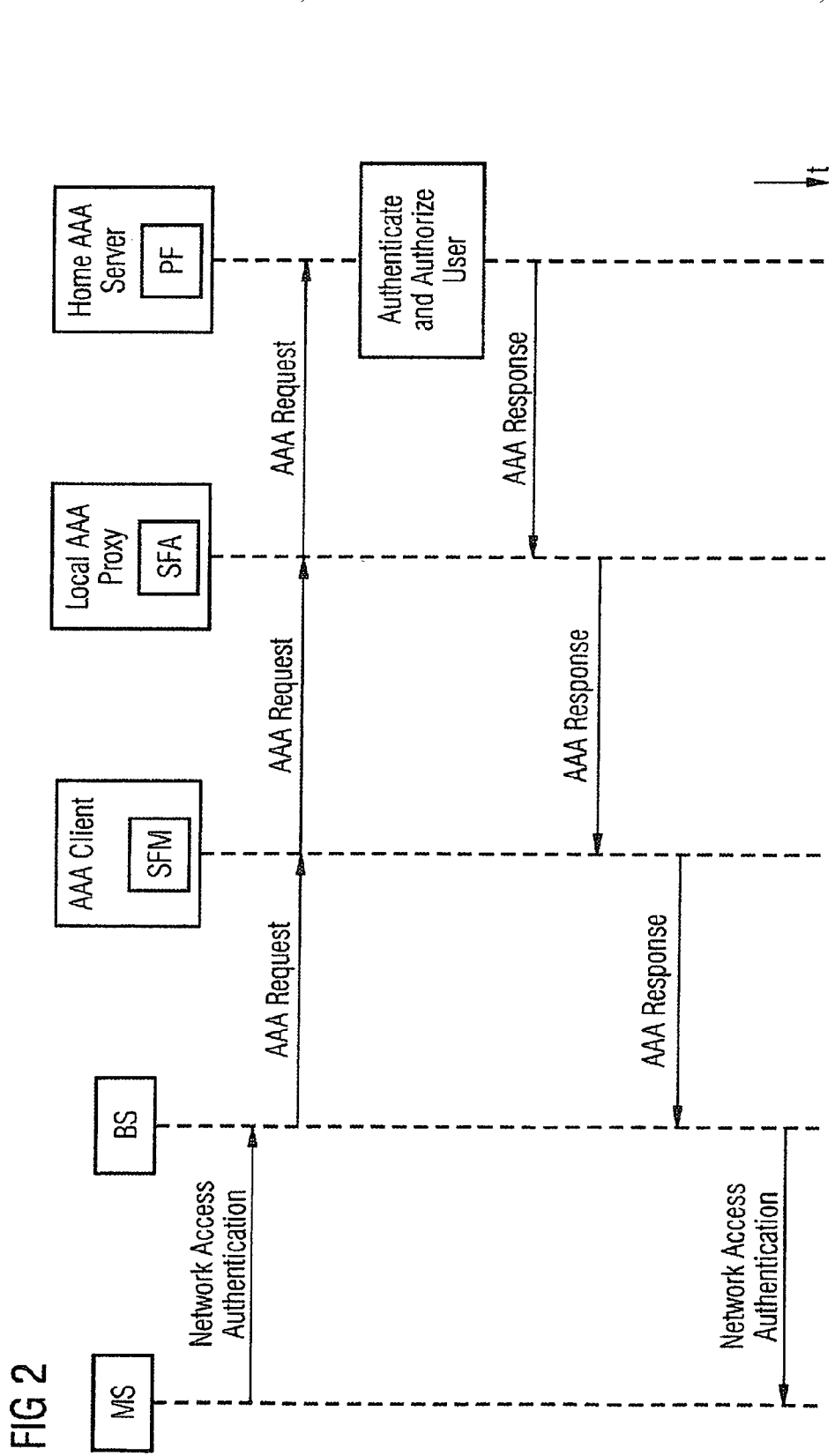
FIG. 2 shows a sequence of a network access procedure.

FIG. 2 shows a sequence of the network access procedure which is carried out when the user registers with the access network ASN. The network terminal MS of the user communicates with the base station BS via the radio interface R1 and sends access information to the base station BS for the authentication of the user. The base station BS submits an authentication, authorization and accounting request AAA Request to the service flow management unit SFM or the authentication, authorization and accounting client AAA Client, which forwards this via the authentication, authorization and accounting proxy Local AAA Proxy to the authentication, authorization and accounting server Home AAA Server of the home network Home NSF of the user. The authentication, authorization and accounting server Home AAA Server or the policy function PF authenticates and authorizes the user for the access to the access network ASN and captures and manages relevant accounting information if applicable. The effected authentication and authorization of the user is delivered to the base station BS via the authentication, authorization and accounting proxy Local AAA Proxy and the authentication, authorization and accounting client AAA Client in the form of an authentication, authorization and accounting response AAA Response and then notified to the network access device MS of the user. As a result of this network access procedure, the authentication, authorization and accounting server Home AAA Server knows the access network ASN in which the user is currently situated.

After the network access procedure is complete, if the user wishes to use a QoS-related application of the application function AF, e.g. obtain a video stream from the application function AF, it is advantageous to provide the required quality of service for the transmission of the video stream from the application function AF to the network terminal MS, in particular with regard to the transmission bandwidth which is required for this purpose, in order to allow a low-interference reception of the video stream at the network terminal MS. In particular, the desired quality of service must be provided on the radio interface R1 in order to achieve this.

Figure 3:
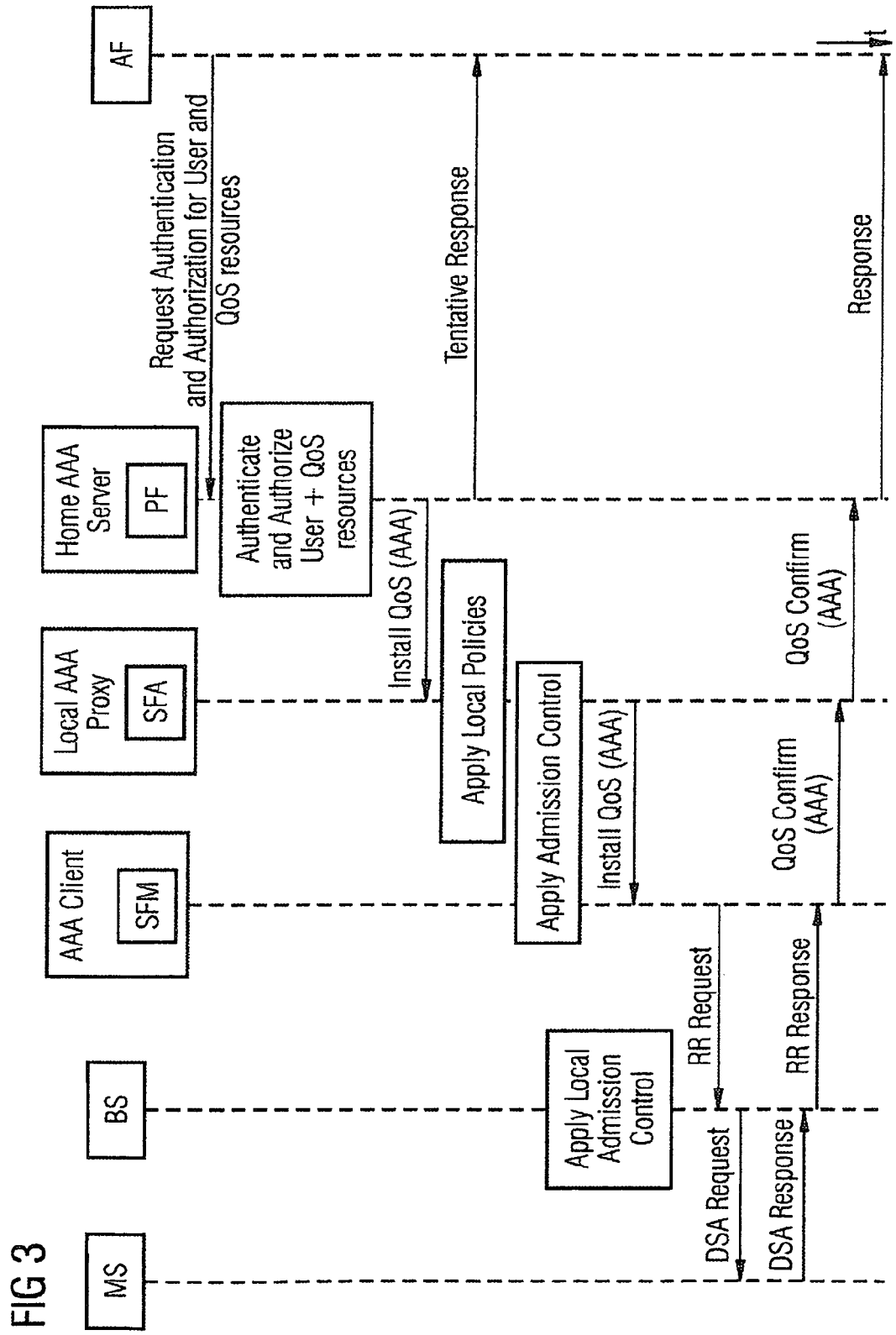
FIG. 3 shows a sequence of signaling the quality of service via an AAA infrastructure.

The application function AF does not generally know the access network ASN in which the user is currently situated. In order to be able to predetermine the desired quality of service on the radio interface R1, it is however necessary to signal the desired quality of service to the base station BS. FIG. 3 shows a sequence of signaling the quality of service via the authentication, authorization and accounting infrastructure. The application function AF requests the authentication and authorization of the user for the use of the application function AF from the authentication, authorization and accounting server Home AAA Server. In addition, the application function AF also sends the desired quality of service to the authentication, authorization and accounting server Home AAA Server. The authentication, authorization and accounting server Home AAA Server authenticates and authorizes the user and optionally also the desired quality of service, and sends a QoS request Install QoS to the authentication, authorization and accounting proxy Local AAA Proxy of the access network ASN. The authentication, authorization and accounting server Home AAA Server can also return a tentative response Tentative Response to the application function AF, in order to notify the latter of the effected authentication and authorization.

The authentication, authorization and accounting proxy Local AAA Proxy optionally applies the local policies Local Policies relating to the use of the resources of the access network ASN by the user. The authentication, authorization and accounting proxy Local AAA Proxy also forwards the QoS request Install QoS to the authentication, authorization and accounting client AAA Client. The admission control Admission Control is performed in the access network ASN, in particular by the service flow management unit SFM and the service flow authorization unit SFA, in order to reserve the resources for the desired quality of service.

The service flow management unit SFM submits a resource request RR Request to the base station BS, which makes the desired resources available locally by the local admission control Local Admission Control. The base station BS sends addition request DSA Request for a dynamic addition of a service to the network terminal MS of the user. The addition request DSA Request can also be referred to as a Dynamic Service Addition request. Depending on the addition request DSA Request, the desired quality of service is established on the radio interface R1 between the network terminal MS and the base station BS on a connection level which can also be referred to as the Link Layer. The network terminal MS responds to the addition request DSA Request by an addition response DSA Response. The base station BS thereupon sends a resource response RR Response to the service flow management unit SFM in order to communicate the effected establishment or reservation of the quality of service on the radio interface R1. The authentication, authorization and accounting client AAA Client thereupon sends a QoS confirmation QoS Confirm via the authentication, authorization and accounting proxy Local AAA Proxy to the authentication, authorization and accounting server Home AAA Server. The authentication, authorization and accounting server Home AAA Server notifies the application function AF of the provision of the quality of service on the radio interface R1 or the non-provision thereof in the event of an error, an access restriction or a non-availability of the desired quality of service.

For signaling the quality of service between the authentication, authorization and accounting server Home AAA Server and the authentication, authorization and accounting client AAA Client, it is possible to use the parameters disclosed e.g. in H. Tschofenig et al., "RADIUS Quality of Service Support", draft-tschofenig-radext-qos-02.txt, October 2005 or in F. Alfano et al., "Diameter Quality of Service Application", draft-alfano-aaa-qosprot-04.txt, September 2005.

However, it is also possible for the application function AF to determine the access network ASN in which the user is currently situated by a corresponding request to the authentication, authorization and accounting server Home AAA Server, which then communicates this access network ASN to the application function AF in a corresponding response. The signaling of the quality of service, using the information that specifies which access network ASN the user is currently situated in, can also be effected in a different manner to that described above if applicable. Moreover, the information can also be used for purposes other than signaling the quality of service if applicable.

Figure 4:
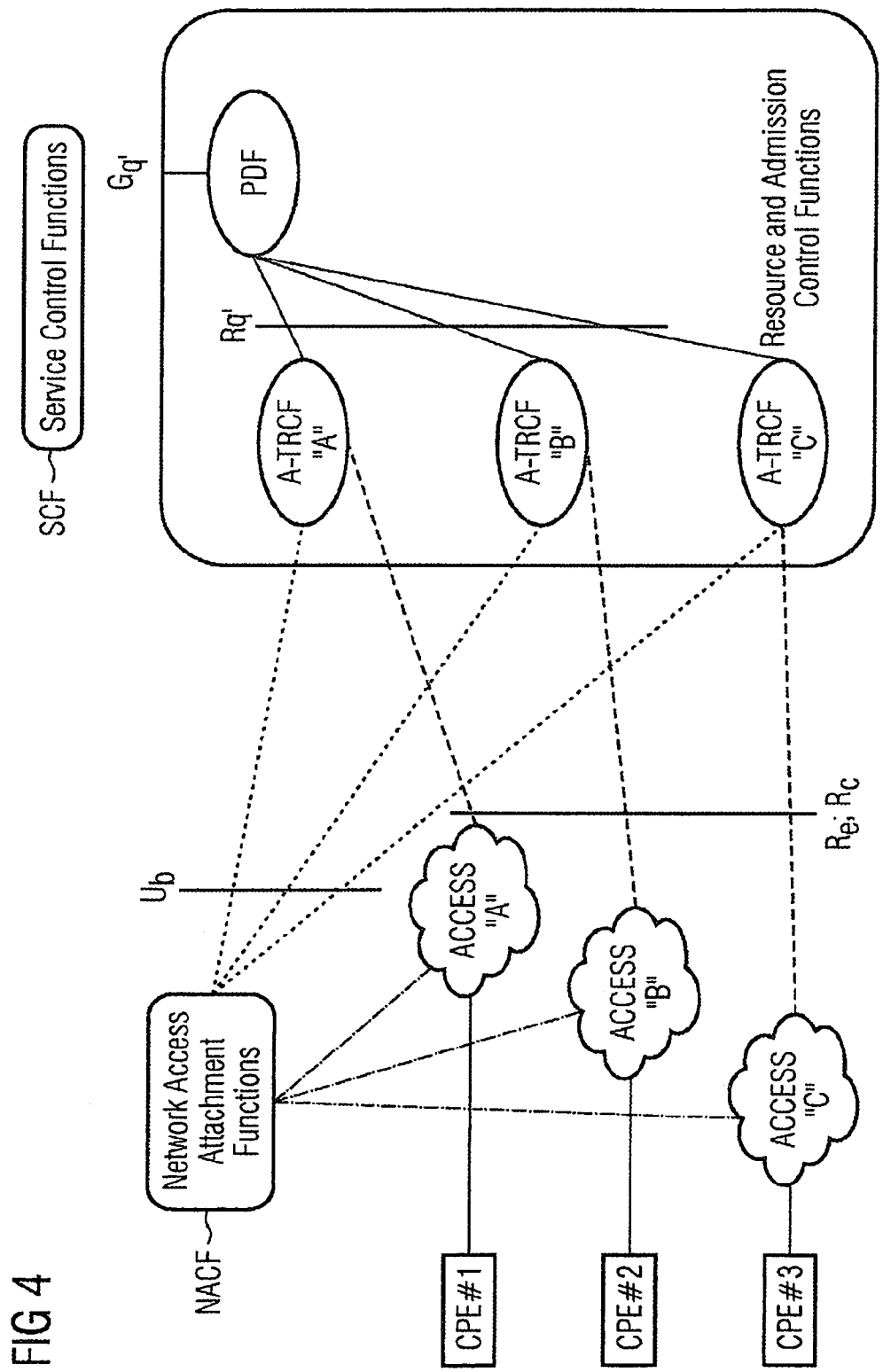
FIG. 4 shows a first embodiment of a communication network as per ITU-T.

In the Study Group 11 of the ITU-T, a network architecture that varies from the network architecture of the WiMAX communication network is the subject of a standardization process and is illustrated in FIG. 4. In this network architecture, the user is linked to an access network ACCESS via a client access device CPE. The client access device CPE (Customer Premises Equipment) allows e.g. attachment to a digital subscriber line (DSL) or is e.g. a cable modem. The access network ACCESS can also be referred to as a network operator ACCESS. The access network ACCESS is linked to a service-independent transport-technology-specific access transport resource control function A-TRCF (Access Transport Resource Control Function) via interfaces Re, Rc. The access transport resource control function A-TRCF is linked to a transport technology-independent service-oriented policy decision function PDF (Policy Decision Function) via an interface Rq'. The policy decision function PDF is linked to a service control function SCF (Service Control Function) via an interface Gq'. With reference to the problem described here, the service control function SCF corresponds approximately to the application function AF in the WiMAX communication network and the policy decision function PDF corresponds approximately to the policy function PF.

Each access network ACCESS features a network attachment control function NACF (Network Attachment Control Function) which is linked via a reference point Ub to the access transport resource control function A-TRCF that is assigned to the relevant access network ACCESS. The user is authenticated and authorized via the network attachment control function NACF and the reference point Ub when registering with the access network ACCESS. As a result of this, the network attachment control function NACF knows the access network ACCESS in which the user is currently situated, i.e. the network attachment control function NACF is notified of the identity of this access network ACCESS because the user registered via the associated client access device CPE and the client access device CPE is permanently assigned to this access network ACCESS. The identity of this access network ACCESS is therefore used by the client access device CPE in order to gain access to the access network ACCESS.

Corresponding to the WiMAX communication network, there exists in the communication network as per the ITU-T the problem of ascertaining the access network ACCESS in which the user is currently situated, e.g. in order to signal and predetermine the quality of service in this access network ACCESS depending on the service control function SCF which the user wishes to use. For this, the policy decision function PDF must select that access transport resource control function A-TRCF to which the client access device CPE of the user is assigned via the associated access network ACCESS.

This access transport resource control function A-TRCF has previously been determined in the context of the network access procedure on the basis of a network address which is assigned to the client access device CPE. However, this has the disadvantage that a substantially static distribution or partitioning of the available network addresses over the different access networks ACCESS must also be predetermined, in order to be able to infer the associated access network ACCESS from the network address of the customer access device CPE. As a result, the network addresses cannot be assigned as required, whereby bottlenecks which might cause access restrictions can occur.

Figure 5:
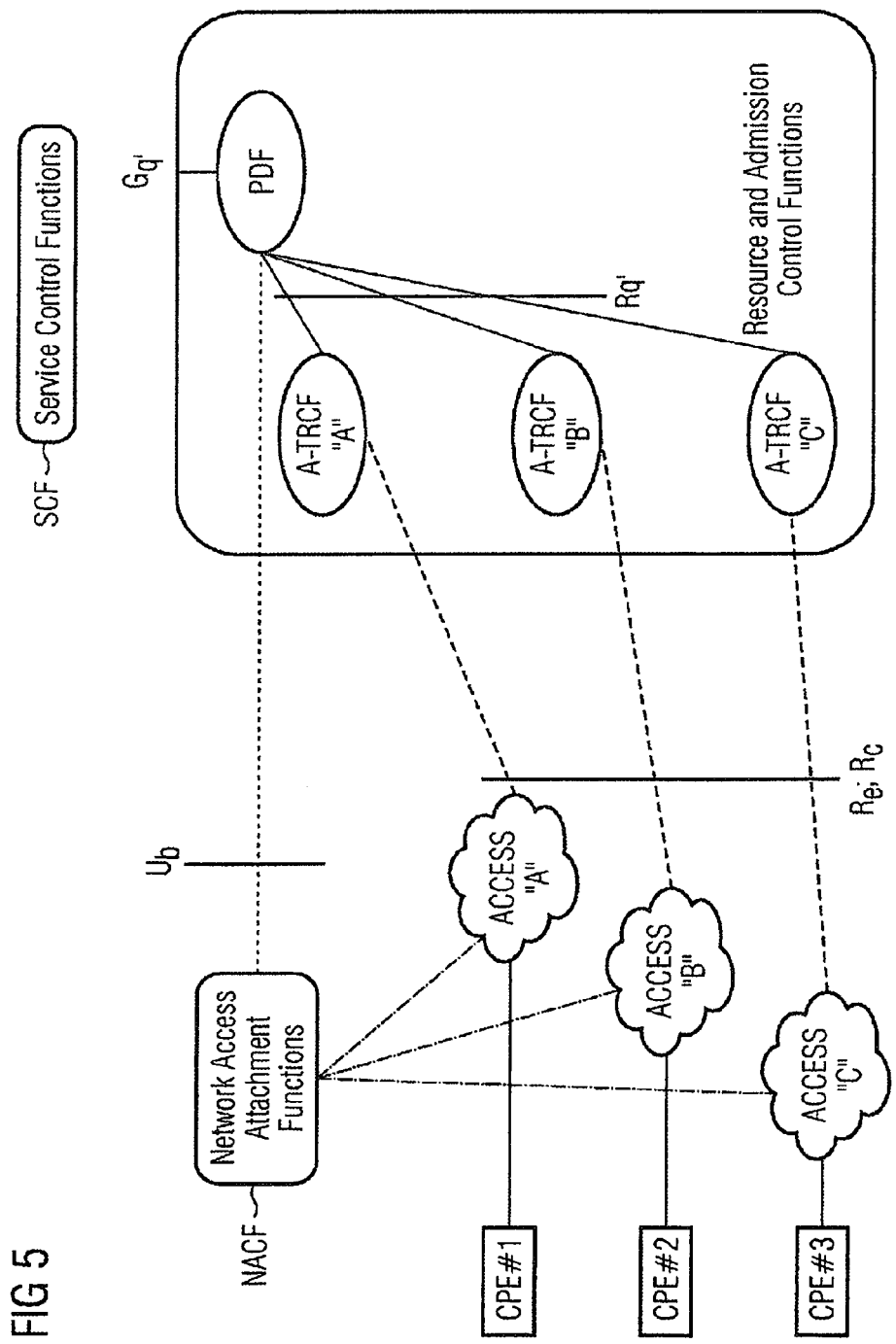
FIG. 5 shows a second embodiment of the communication network as per ITU-T.

According to the proposed method, the policy decision function PDF therefore communicates or interacts with the network attachment control function NACF. This communication or interaction preferably takes place via the reference point Ub which, instead of being provided between the network attachment control function NACF and the relevant access transport resource control function A-TRCF (FIG. 4), is provided between the network attachment control function NACF and the policy decision function PDF (FIG. 5). The communication which is intended between the network attachment control function NACF and the relevant access transport resource control function A-TRCF preferably then takes place via the policy decision function PDF and the interface Rq'. On the basis of the network architecture illustrated in FIG. 4, however, provision can alternatively be made for an additional reference point (not shown) between the network attachment control function NACF and the policy decision function PDF.

The reference point Ub preferably represents an authentication, authorization and accounting infrastructure of the communication network, i.e. in a manner that corresponds to the WiMAX communication network, in the case of the communication network as per the ITU-T the access network ACCESS in which the user is currently situated is determined by using the authentication, authorization and accounting infrastructure, which knows this access network ACCESS as a result of the network access procedure that was previously carried out for the user. Given the knowledge of this access network ACCESS, the signaling of the quality of service in this access network ACCESS can be done very easily, e.g. by likewise using the authentication, authorization and accounting infrastructure or by another method for signaling and providing the quality of service.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in *Superguide v. DIRECTV*, 69 USPQ2d 1865 (Fed. Cir. 2004).

The invention claimed is:

1. A method for setting up a desired quality of service (QoS) on a radio interface from an access network to a user in a WiMAX communication network, the radio interface being set up to provide a QoS-related application to the user, the QoS-related application being provided by an application function associated with a home network of the user, the method comprising:
   signalling a desired quality of service via an authentication, authorization and accounting infrastructure of the WiMAX communication network;
   communicating between the application function and an authentication, authorization and accounting server of the home network of the user for authenticating and authorizing the user, the application function requesting the authentication and authorization of the user for the use of the application function from the authentication, authorization and accounting server; and
   transmitting the desired quality of service for the QoS-related application from the application function to the authentication, authorization and accounting server while communicating to authenticate and authorize the user,
   wherein after authenticating and authorizing the user, a QoS request is submitted to an authentication, authorization and accounting client of the access network to provide the desired quality of service radio interface.

2. The method as claimed in claim 1, wherein
   the authentication, authorization and accounting server communicates with an authentication, authorization and accounting proxy, and
   the QoS request is submitted to the authentication, authorization and accounting client via the authentication, authorization and accounting proxy.

3. The method as claimed in claim 2, wherein
   local policies are applied by the authentication, authorization and accounting proxy, and
   an admission control is carried out in the access network.

4. The method as claimed in claim 3, wherein the authentication, authorization and accounting client signals a base station to provide the quality of service on the radio interface on a connection level.

5. The method as claimed in claim 4, wherein after signaling the base station to provide the quality of service on the connection level, a QoS confirmation is reported back along the authentication, authorization and accounting infrastructure to the authentication, authorization and accounting server.

6. The method as claimed in claim 1, wherein the authentication, authorization and accounting client signals a base station to provide the quality of service on the radio interface on a connection level.

7. The method as claimed in claim 6, wherein after signaling the base station to provide the quality of service on the connection level, a QoS confirmation is reported back along the authentication, authorization and accounting infrastructure to the authentication, authorization and accounting server.

* * * * *